(12) United States Patent
Gao et al.

(10) Patent No.: US 8,737,474 B2
(45) Date of Patent: May 27, 2014

(54) METHOD AND APPARATUS FOR ENCODING AND/OR DECODING VIDEO DATA USING ENHANCEMENT LAYER RESIDUAL PREDICTION FOR BIT DEPTH SCALABILITY

(75) Inventors: Yong Ying Gao, Beijing (CN); Yu Wen Wu, Beijing (CN); Charles Chuanming Wang, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 655 days.

(21) Appl. No.: 12/452,293

(22) PCT Filed: Jun. 27, 2007

(86) PCT No.: PCT/CN2007/002009
§ 371 (c)(1),
(2), (4) Date: Dec. 23, 2009

(87) PCT Pub. No.: WO2009/000110
PCT Pub. Date: Dec. 31, 2008

(65) Prior Publication Data
US 2010/0135393 A1 Jun. 3, 2010

(51) Int. Cl.
*H04N 7/50* (2006.01)
*H04N 7/26* (2006.01)

(52) U.S. Cl.
CPC .... *H04N 19/00315* (2013.01); *H04N 19/00424* (2013.01); *H04N 19/00442* (2013.01)
USPC ............ 375/240.15; 375/240.01; 375/240.12; 375/240.18; 375/240.23

(58) Field of Classification Search
CPC .................. H04N 19/00315; H04N 19/00424; H04N 19/00442
USPC ..................................................... 375/240.15
See application file for complete search history.

(56) References Cited

U.S. PATENT DOCUMENTS 5,973,739 A * 10/1999 Nilsson ...................... 375/240.1
8,194,733 B2 * 6/2012 Cho et al. ................. 375/240.01
(Continued)

FOREIGN PATENT DOCUMENTS

WO 2004/114671 A2 12/2004

OTHER PUBLICATIONS

Advances in the scalable amendment of H.264/AVC Hsiang-Chun Huang; Wen-Hsiao Peng; Tihao Chiang; Hsueh-Ming Hang. IEEE Communications Magazine 45. 1: 68-76. IEEE. (Jan. 2007).*

(Continued)

*Primary Examiner* — William C Vaughn, Jr.
*Assistant Examiner* — Luis M Perez
(74) *Attorney, Agent, or Firm* — Tutunjian & Bitetto, P.C.

(57) ABSTRACT

A scalable video bitstream may have an H.264/AVC compatible base layer and a scalable enhancement layer, where scalability refers to color bit depth. The H.264/AVC scalability extension SVC provides also other types of scalability, e.g. spatial scalability where the number of pixels in BL and EL are different. According to the invention, BL information is upsampled in two logical steps, one being texture upsampling and the other being bit depth upsampling. Texture upsampling is a process that increases the number of pixels, and bit depth upsampling is a process that increases the number of values that each pixel can have, corresponding to the pixels color intensity. The upsampled BL data are used to predict the collocated EL. The BL information is upsampled at the encoder side and in the same manner at the decoder side, wherein the upsampling refers to spatial and bit depth characteristics.

10 Claims, 6 Drawing Sheets

(56) References Cited

U.S. PATENT DOCUMENTS

| | | | | |
|---|---|---|---|---|
| 8,411,753 | B2* | 4/2013 | Cha et al. | 375/240.18 |
| 8,428,128 | B2* | 4/2013 | Park et al. | 375/240.12 |
| 2002/0071486 | A1 | 6/2002 | Van Der Schaar et al. | |
| 2005/0259729 | A1* | 11/2005 | Sun | 375/240.1 |
| 2005/0265442 | A1 | 12/2005 | Kim | |
| 2006/0257034 | A1 | 11/2006 | Gish et al. | |
| 2007/0286283 | A1* | 12/2007 | Yin et al. | 375/240.16 |
| 2008/0089424 | A1* | 4/2008 | Karczewicz et al. | 375/240.23 |
| 2009/0110054 | A1* | 4/2009 | Kim et al. | 375/240.1 |
| 2010/0020866 | A1* | 1/2010 | Marpe et al. | 375/240.02 |
| 2010/0158110 | A1* | 6/2010 | Pandit et al. | 375/240.12 |
| 2010/0260260 | A1* | 10/2010 | Wiegand et al. | 375/240.12 |
| 2011/0228855 | A1* | 9/2011 | Gao et al. | 375/240.18 |

OTHER PUBLICATIONS

Motion compensated prediction for scalable video coding in the wavelet domain Li, Xin; Yin, Baocai; Su, Haibin; Yang, Meng; Li, X.. Journal of Information and Computational Science 2. 3: 507-516. Sun Yat-sen (Zhongshan) University. (Dec. 1, 2005).*

A hybrid spatial-temporal fine granular scalable coding for adaptive QoS Internet video Chung-Ming Huang; Chung-Wei Lin. Proceedings. 31st Euromicro Conference on Software Engineering and A 338-44;xvii+492. IEEE Comput. Soc. (2005).*

A scheme for spatial scalability using nonscalable encoders Dugad, R.; Ahuja, N.. IEEE Transactions on Circuits and Systems for Video Technology 13. 10: 993-9. IEEE. (Oct. 2003).*

Gao, Y. et al., "Bit-depth scalability", ITU Study Group 16 Video Coding Experts Group ISO-IEC MPEG and ITU-T VCEG ISO-IEC JTC1 SC29 WG11 and ITU-T S, 22nd Meeting: Marrakech, Morocco, Jan. 13-19, 2007.

Gao, Y. et al., "CE4 SVC Bit-depth scalability simulation results", ITU Study Group 16 Video Coding Experts Group ISO-IEC MPEG and ITU-T VCEG ISO-IEC JTC1 SC29 WG11 and ITU-T S, 23rd Meeting: San Jose, California USA, Apr. 21-27, 2007.

"Meeting Report San Jose Draft 7", ITU Study Group 16 Video Coding Experts Group ISO-IEC MPEG and ITU-T VCEG ISO-IEC JTC1 SC29 WG11 and ITU-T S, 23rd Meeting: San Jose, California USA, Apr. 21-27, 2007.

Schwarz, H. et al., "Contrained Inter-Layer Prediction for single-loop decoding in spacial scalability", Image Processing 2005, ICIP 2005, vol. 2, Sep. 11, 2005, pp. 870-873.

Winken, M. et al. "SVC bit depth scalability", ITU Study Group 16 Video Coding Experts Group ISO-IEC MPEG and ITU-T VCEG ISO-IEC JTC1 SC29 WG11 and ITU-T S, 22nd Meeting: Marrakech, Morocco, Jan. 13-19, 2007.

Search Report Dated Mar. 14, 2008.

Segall et al., "System for Bit-Depth Scalable Coding", Joint Video Team (JVT) of ISO/IEC MPEG & ITU-T VCEG (ISO/IEC JTC1/SC29IWG11 and ITU-T SG16 Q.6) 23rd Meeting: San Jose, California, USA, Document: JVT-W113, ITU-T, Apr. 2007. (7 pages).

* cited by examiner

Fig.2 (Intra-encoder)

Fig.3 (Inter-encoder)

Fig. 4 (Intra-Decoder)

Fig.5 (Inter-Decoder)

METHOD AND APPARATUS FOR ENCODING AND/OR DECODING VIDEO DATA USING ENHANCEMENT LAYER RESIDUAL PREDICTION FOR BIT DEPTH SCALABILITY

This application claims the benefit, under 35 U.S.C. §365 of International Application PCT/CN2007/002009, filed Jun. 27, 2007, which was published in accordance with PCT Article 21(2) on Dec. 31, 2008 in English.

FIELD OF THE INVENTION

The invention relates to the technical field of digital video coding. It presents a coding solution for a novel type of scalability: bit depth scalability.

BACKGROUND

In recent years, higher color depth rather than the conventional eight bit color depth is more and more desirable in many fields, such as scientific imaging, digital cinema, high-quality-video-enabled computer games and professional studio and home theatre related applications. Accordingly, the state-of-the-art video coding standard H.264/AVC has already included Fidelity Range Extensions (FRExt), which support up to 14 bits per sample and up to 4:4:4 chroma sampling. The current SVC reference software JSVM does not support high bit depth.

However, none of the existing advanced coding solutions supports bit depth scalability. For a scenario with two different decoders, or clients with different requests for the bit depth, e.g. 8 bit and 12 bit for the same raw video, the existing H.264/AVC solution is to encode the 12-bit raw video to generate a first bitstream, and then convert the 12-bit raw video to an 8-bit raw video and encode it to generate a second bitstream. If the video shall be delivered to different clients who request different bit depths, it has to be delivered twice, e.g. the two bitstreams are put in one disk together. This is of low efficiency regarding both the compression ratio and the operational complexity.

The European Patent application EP06291041 discloses a scalable solution to encode the whole 12-bit raw video once to generate one bitstream that contains an H.264/AVC compatible base layer (BL) and a scalable enhancement layer (EL). The overhead of the whole scalable bitstream compared to the above-mentioned first bitstream is small compared to the additional second bitstream. If an H.264/AVC decoder is available at the receiving end, only the BL sub-bitstream is decoded, and the decoded 8-bit video can be viewed on a conventional 8-bit display device; if a bit depth scalable decoder is available at the receiving end, both the BL and the EL sub-bitstreams may be decoded to obtain the 12-bit video, and it can be viewed on a high quality display device that supports color depths of more than eight bit.

SUMMARY OF THE INVENTION

The H.264/AVC scalability extension SVC provides also other types of scalability, e.g. spatial scalability. In spatial scalability the number of pixels in BL and EL are different. Thus, the problem arises how to combine bit depth scalability with other scalability types, and in particular spatial scalability. The present invention provides a solution for this problem.

Claim 1 discloses a method for encoding that allows the combination of bit depth scalability and other scalability types. Claim 5 discloses a corresponding decoding method.

An apparatus that utilizes the method for encoding is disclosed in claim 9, and an apparatus that utilizes the method for decoding is disclosed in claim 10.

According to the invention, a look-up table (LUT) based inverse tone mapping technique is employed in the inter-layer prediction to improve the coding efficiency. The LUT based inverse tone mapping technique is used when the BL slice type is I-slice. The LUT is created based on the reconstructed BL I-slice at the encoder and the collocated original EL slice. The whole solution can be implemented within the structure of SVC, and compatibility to other types of scalability, temporal, spatial and SNR scalability is supported.

In one embodiment, the BL information is upsampled in two logical steps, one being texture upsampling and the other being bit depth upsampling. Texture upsampling is a process that increases the number of pixels, and bit depth upsampling is a process that increases the number of values that each pixel can have. The value corresponds to the color intensity of the pixel. The upsampled BL unit is used to predict the collocated EL unit. An encoder generates a residual from the EL video data, and the residual may be further encoded (usually entropy coded) and transmitted. The BL information to be upsampled can be of any granularity, e.g. units of single pixels, pixel blocks, macroblocks (MBs) or whole images. Further, it is possible to perform the two logical upsampling steps in a single step. The base layer information is upsampled at the encoder side and in the same manner at the decoder side, wherein the upsampling refers to spatial and bit depth characteristics.

Moreover, the combined spatial and bit depth upsampling can be performed for intra coded as well as for inter coded images.

In particular, a method for encoding video data having a base layer and an enhancement layer, wherein pixels of the base layer have less bit depth and lower spatial resolution than pixels of the enhancement layer, comprises the steps of encoding base layer data on slice level, wherein first base layer slices are intra-coded and second base layer slices are inter-coded, reconstructing the encoded base layer slices, upsampling reconstructed base layer slices, wherein first predicted versions of the corresponding enhancement layer slices are obtained that have higher spatial, temporal or SNR resolution than the base layer slices, generating for a first, intra-coded base layer slice a tone mapping table (LUT) defining an individual mapping between an upsampled reconstructed first base layer slice and the corresponding original enhancement layer slice, wherein both slices are compared to each other and wherein no tone mapping tables are generated for second, inter-coded base layer slices, bit-depth upsampling the first predicted version of the enhancement layer slice based on said tone mapping, wherein a second predicted version of the corresponding enhancement layer slice is obtained that has higher bit-depth resolution than the first predicted version of the enhancement layer slice, generating an enhancement layer residual being the difference between the original enhancement layer slice and the corresponding second predicted version of the enhancement layer slice, and encoding the enhancement layer residual into an enhancement layer slice, wherein the enhancement layer slice includes in its slice header its corresponding tone mapping table.

According to one aspect of the invention, a method for decoding video data comprises the steps of receiving enhancement layer information and base layer information, extracting from the enhancement layer information tone mapping data from slice headers of intra-coded enhancement layer slices, performing inverse quantization and inverse transformation (e.g. DCT) on the received information, wherein inverse quantized and inverse transformed enhancement layer information comprises residual information, reconstructing intra-coded base layer slices, upsampling base layer information, wherein the number of pixels is increased and for the increased number of pixels the value depth per pixel is increased, wherein for intra-coded slices the reconstructed base layer slices and the extracted tone mapping data are used, and wherein predicted enhancement layer information is obtained, and reconstructing from the predicted enhancement layer information and the inverse quantized and inverse transformed enhancement layer information reconstructed enhancement layer video information.

In one embodiment of the invention, the method for encoding comprises steps of intra-encoding BL information, reconstructing the intra-encoded BL information, performing spatial upsampling and color bit depth upsampling on the reconstructed BL information, and generating an EL residual being the difference between current EL information (i.e. image data) and said spatially and color bit depth upsampled BL information (i.e. image data).

In one embodiment of the invention, the method for encoding comprises steps of generating a BL residual being the difference between current BL image data and predicted BL image data (as usual for inter-coded BL), wherein the predicted BL image data can be predicted from data of the current or a previous BL image, encoding (i.e. transforming and quantizing) said BL residual, reconstructing (inverse transforming and inverse quantizing) the encoded BL residual, performing residual (spatial) upsampling and color bit depth upsampling on the reconstructed BL residual and generating an EL inter-layer residual being the difference between current EL residual data and said spatially and color bit depth upsampled reconstructed BL residual.

Advantageously, the two mentioned encoder embodiments can be combined into a combined encoder that can adaptively encode intra- and inter-encoded video data.

In one embodiment of the invention, the method for decoding further comprises steps of (implicitly) detecting that the received BL information is intra-coded, reconstructing BL video from the received inverse quantized and inverse transformed BL information, upsampling the reconstructed BL video, wherein the upsampling comprises texture (spatial) upsampling and bit depth upsampling and wherein predicted EL information is obtained, and reconstructing from the predicted EL information and the inverse quantized and inverse transformed received EL information reconstructed EL video information.

In one embodiment of the invention, the method for decoding comprises steps of (implicitly) detecting that received BL data are inter-coded, extracting a BL residual from the received BL data, performing residual (spatial) upsampling and color bit depth upsampling on the extracted BL residual, extracting an EL residual from the inverse quantized and inverse transformed EL information, reconstructing from the EL residual and the upsampled BL residual a reconstructed EL residual and reconstructing from the reconstructed EL residual and previously reconstructed EL information reconstructed EL video information.

Advantageously, the two mentioned decoder embodiments can be combined into a combined decoder that can adaptively decode intra- and inter-encoded video data.

According to another aspect of the invention, an apparatus for encoding video data having a base layer and an enhancement layer, wherein the base layer has lower color resolution and lower spatial resolution than the enhancement layer, comprises means for encoding base layer data on slice level, wherein first base layer slices are intra-coded and second base layer slices are inter-coded, means for reconstructing the encoded base layer slices, means for upsampling reconstructed base layer slices, wherein first predicted versions of the corresponding enhancement layer slices are obtained that have higher spatial, temporal or SNR resolution than the base layer slices, means for generating for a first, intra-coded base layer slice a tone mapping table defining an individual mapping between an upsampled reconstructed first base layer slice and the corresponding original enhancement layer slice, wherein both slices are compared to each other and wherein no tone mapping tables are generated for second, inter-coded base layer slices, means for bit-depth upsampling the first predicted version of the enhancement layer slice based on said tone mapping, wherein a second predicted version of the corresponding enhancement layer slice is obtained that has higher bit-depth resolution than the first predicted version of the enhancement layer slice, means for generating an enhancement layer residual being the difference between the original enhancement layer slice and the corresponding second predicted version of the enhancement layer slice, and means for encoding the enhancement layer residual into an enhancement layer slice, wherein the enhancement layer slice includes in its slice header its corresponding tone mapping table.

In one embodiment of the invention, an apparatus for encoding or decoding video data comprises means for performing spatial (residual or texture) upsampling and means for performing color bit depth upsampling, wherein the means for spatial upsampling increases the number of values within the BL information and the means for color bit depth upsampling increases the color range of the values and wherein spatially and color bit depth upsampled BL data are obtained.

According to another aspect of the invention, an encoded scalable video signal comprises intra-coded BL data and intra-coded EL data, wherein the intra-coded EL data comprises a residual being the difference between an upsampled BL image and an EL image, wherein the residual comprises differential texture information and differential bit depth information.

Various embodiments of the presented coding solution are compatible to H.264/AVC and all kinds of scalability that are currently defined in H.264/AVC scalable extension (SVC).

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a framework of color bit depth scalable coding.

DETAILED DESCRIPTION OF THE INVENTION

Figure 1:
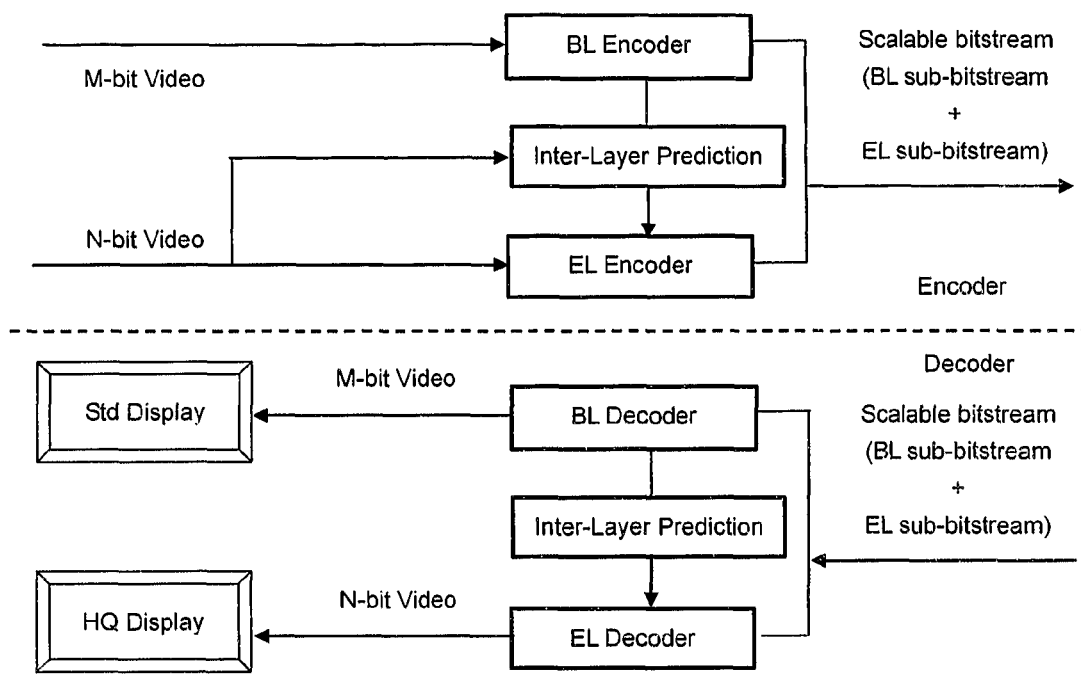

As shown in FIG. 1, two videos are used as input to the video encoder: N-bit raw video and M-bit (M<N, usually M=8) video. The M-bit video can be either decomposed from the N-bit raw video or given by other ways. The scalable solution can reduce the redundancy between two layers by using pictures of the BL. The two video streams, one with 8-bit color and the other with N-bit color (N>8), are input to the encoder, and the output is a scalable bit-stream. It is also possible that only one N-bit color data stream is input, from which an M-bit (M<N) color data stream is internally generated for the BL. The M-bit video is encoded as the BL using the included H.264/AVC encoder. The information of the BL can be used to improve the coding efficiency of the EL. This is called inter-layer prediction herein. Each picture—a group of MBs—has two access units, one for the BL and the other one for the EL. The coded bitstreams are multiplexed to form a scalable bitstream. The BL encoder comprises e.g. an H.264/AVC encoder, and the reconstruction is used to predict the N-bit color video, which will be used for the EL encoding. As shown in FIG. 1, the scalable bit-stream exemplarily contains an AVC compliant BL bit-stream, which can be decoded by a BL decoder (conventional AVC decoder). Then the same prediction as in the encoder will be done at the decoder side (after evaluation of a respective indication) to get the predicted N-bit video. With the N-bit predicted video, the EL decoder will then use the N-bit prediction to generate the final N-bit video for a High Quality display HQ.

In the following, when the term color bit depth is used it means bit depth, i.e. the number of bits per value. This is usually corresponding to color intensity.

In one embodiment, the present invention is based on the current structure of SVC spatial, temporal and quality scalability, and is enhanced by bit depth scalability for enhanced color bit depth. Hence, this embodiment is completely compatible to the current SVC standard. However, it will be easy for the skilled person to adapt it to other standards. The key of bit depth scalability is the bit depth inter-layer prediction. By using the inter-layer prediction, the difference between the N-bit and M-bit video is encoded as the EL. For the convenience of statements, the following denotations will be used in the following:

$BL_{org}$: base layer original MB
$BL_{res}$: base layer residual MB
$BL_{rec}$: base layer reconstructed MB
$EL_{org}$: enhancement layer original MB
$EL_{rec}$: enhancement layer reconstructed MB
$EL'_{res}$: enhancement layer residual MB
$Pre_c\{\ \}$: color bit depth inter-layer prediction operator
$Pre_t\{\ \}$: texture (spatial) inter-layer prediction operator
$Pre_r\{\ \}$: residual (spatial) inter-layer prediction operator This invention applies a LUT based inverse tone mapping technique that is employed in the inter-layer prediction of bit-depth scalable coding, to improve the coding efficiency. The LUT is created at the encoder end, based on the relationship between the reconstructed BL slice and the collocated original EL slice. In general, one LUT is created for each luminance/chrominance channel: Y, Cb, and Cr. In practice, the different channel may share the same LUT. Then the created LUT is used during the inter-layer prediction at the encoder to de-correlate the redundancy between the BL and the EL. The LUT is inserted into the bitstream and can be recovered at the decoder end. The decoder will use the same LUT in the inter-layer prediction, and thus can reconstruct the EL with high quality.

According to one aspect of the invention, the LUT based inverse tone mapping technique is only used when the BL slice is intra-coded (I-slice). This has the advantage that it is compliant to single-loop decoding of intra-coded slices, as used e.g. in the current SVC standard, and that it is compatible to other types of scalabilities, as also supported in the current SVC standard.

Exemplarily, the SVC compatible MB level bit depth scalable coding solution is based on the current SVC spatial scalability. The following provides a detailed description of the extension of the spatial scalability to bit depth scalability for both intra coding and inter coding. The first step of SVC compatible bit depth scalable coding is to support high bit coding as what the H.264/AVC FRExt extension does (currently 10 to 14 bits per sample) in the EL encoding and decoding.

Intra Coding

Figure 2:
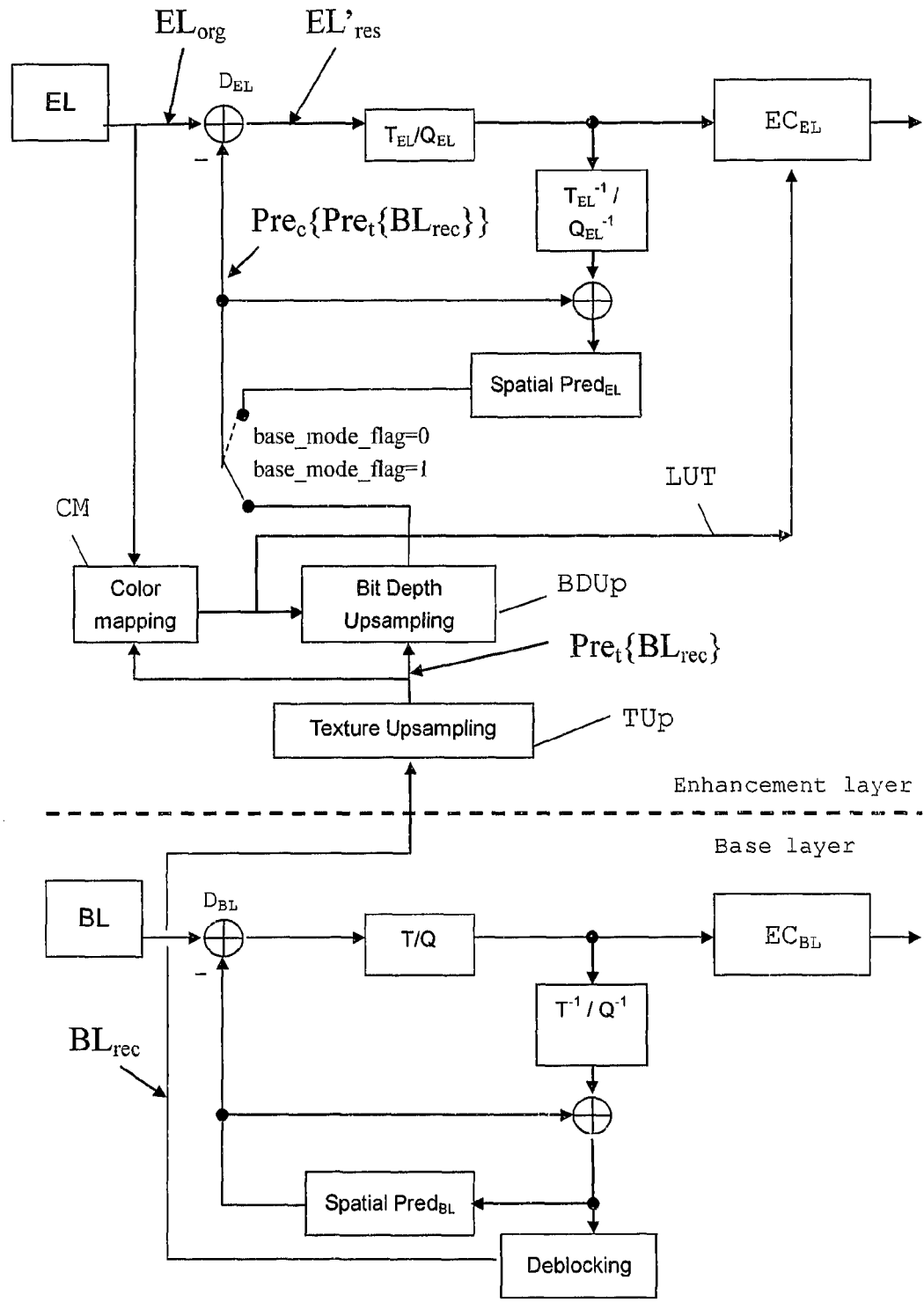
FIG. 2 an encoder for the extension of the intra texture inter-layer prediction of spatial scalability to color bit depth scalability.

FIG. 2 shows an encoder for the extension of intra texture inter-layer prediction of spatial scalability, as used in the current SVC standard, to bit depth scalability. The bit depth upsampling block BDUp represents the extension to bit depth scalability, while the other blocks represent the spatial scalability in the current SVC standard. This block BDUp is the difference between a conventional SVC intra encoder and the intra encoder according to the invention. In FIG. 2, M-bit base layer MBs are input to the BL encoder, and N-bit enhancement layer MBs are input to the EL encoder (N>M). In the current SVC standard, the texture upsampling was designed for spatial intra texture inter-layer prediction. In FIG. 2 the input to texture upsampling TUp is the reconstructed BL macroblock $BL_{rec}$, and the output is the spatially (texture) predicted version of the EL macroblock $Pre_t\{BL_{rec}\}$. The bit depth scalability is realized by the step of bit depth upsampling BDUp that (in this example) directly follows texture upsampling TUp. In practice, it is often advantageous to apply the texture upsampling as a spatial inter-layer prediction first, and then the bit depth upsampling BDUp is done as a bit depth inter-layer prediction. With both the texture upsampling TUp and the bit depth upsampling BDUp, a predicted version $Pre_c\{Pre_t\{BL_{rec}\}\}$ of the N-bit EL macroblock is obtained. A similar residual could be obtained by reverse order of the prediction steps.

The residual $EL'_{res}$ between the original N-bit EL macroblock $EL_{org}$ and its predicted version $Pre_c\{Pre_t\{BL_{rec}\}\}$ is obtained by a difference generator $D_{EL}$. The residual is in one embodiment of the invention further transformed T, quantized Q and entropy encoded $EC_{EL}$ to form the EL sub-bit-stream, like in SVC. In a mathematical expression, the residual of color bit depth intra upsampling is $$EL'_{res}=EL_{org}-Pre_c\{Pre_t\{BL_{rec}\}\}, \qquad (Eq.\ 1)$$

where $Pre_t\{\ \}$ represents the texture upsampling operator.

Different variations of the encoding process are possible, and can be controlled by control parameters. An exemplary flag base_mode_flag is shown in FIG. 2 that decides whether EL residuals are predicted based on reconstructed EL information or based on upsampled EL information.

In the following, an illustrative embodiment of the technical solution to enable LUT based inverse tone mapping in SVC bit-depth scalability is presented. In detail, some new syntax elements are added to the slice header in scalable extension, as exemplarily shown in lines 46-71 of Tab. 1. The following expressions are used:

inv_tone_map_flag equal to 1 specifies that the process of inverse tone mapping shall be invoked in the inter-layer prediction for Y channel. inv_tone_map_flag equal to 0 specifies that no process of inverse tone mapping shall be invoked in the inter-layer prediction for Y channel (default).

lookup_table_luma_inv_tone_map_flag equal to 1 specifies that the lookup table based inverse tone mapping is employed in the inter-layer prediction for Y channel.

TABLE 1

Exemplary implementation within Slice Header in scalable extension

| # | slice_header_in_scalable_extension( ) { | C | Descriptor |
|---|---|---|---|
| 1 | first_mb_in_slice | 2 | ue(v) |
| 2 | slice_type | 2 | ue(v) |
| 3 | pic_parameter_set_id | 2 | ue(v) |
| 4 | frame_num | 2 | u(v) |
| 5 | if( !frame_mbs_only_flag ) { | | |
| 6 |     field_pic_flag | 2 | u(1) |
| 7 |     if( field_pic_flag ) | | |
| 8 |         bottom_field_flag | 2 | u(1) |
| 9 | } | | |
| 10 | if( nal_unit_type == 21) | | |
| 11 |     idr_pic_id | 2 | ue(v) |
| 12 | if( pic_order_cnt_type == 0 ) { | | |
| 13 |     pic_order_cnt_lsb | 2 | u(v) |
| 14 |     if( pic_order_present_flag && !field_pic_flag) | | |
| 15 |         delta_pic_order_cnt_bottom | 2 | se(v) |
| 16 | } | | |
| 17 | if( pic_order_cnt_type == 1 && !delta_pic_order_always_zero_flag ) { | | |
| 18 |     delta_pic_order_cnt[ 0 ] | 2 | se(v) |
| 19 |     if( pic_order_present_flag && !field_pic_flag ) | | |
| 20 |         delta_pic_order_cnt[ 1 ] | 2 | se(v) |
| 21 | } | | |
| 22 | if( redundant_pic_cnt_present flag ) | | |
| 23 |     redundant_pic_cnt | 2 | ue(v) |
| 24 | if( slice_type == EB ) | | |
| 25 |     direct_spatial_mv_pred_flag | 2 | u(1) |
| 26 | if( quality_id == 0 ) { | | |
| 27 |     if( slice_type == EP || slice_type == EB ) { | | |
| 28 |         num_ref_idx_active_override_flag | 2 | u(1) |
| 29 |         if( num_ref_idx_active_override_flag ) { | | |
| 30 |             num_ref_idx_l0_active_minus1 | 2 | ue(v) |
| 31 |             if( slice_type == EB ) | | |
| 32 |                 num_ref_idx_l1_active_minus1 | 2 | ue(v) |
| 33 |         } | | |
| 34 |     } | | |
| 35 |     Ref_pic_list_reordering( ) | 2 | |
| 36 |     if( ! layer_base_flag ) { | | |
| 37 |         base_id | 2 | ue(v) |
| 38 |         adaptive_prediction_flag | 2 | u(1) |
| 39 |         if( ! adaptive_prediction flag ) { | | |
| 40 |             default_base_mode_flag | 2 | u(1) |
| 41 |             if( ! default_base_mode_flag ) { | | |
| 42 |                 adaptive_motion_prediction_flag | 2 | u(1) |
| 43 |                 if( ! adaptive_motion_prediction_flag ) | | |
| 44 |                     default_motion_prediction_flag | 2 | u(1) |
| 45 |             } | | |
| 46 |             inv_tone_map_flag | 1 | u(1) |
| 47 |             if( inv_tone_map_flag ) { | | |
| 48 |                 lookup_table_luma_inv_tone_map_flag | 1 | u(1) |
| 49 |                 if( lookup_table_luma_inv_tone_map_flag ) { | | |
| 50 |                     level_lookup_table_luma_minus8 | 1 | u(v) |
| 51 |                     for ( i=0; i<(1<<(8+ level_lookup_table_luma_minus8)); i++ ) { | | |
| 52 |                         offset_val_lookup_table_luma[ i ] | 1 | u(v) |
| 53 |                     } | | |
| 54 |                 } | | |
| 55 |                 lookup_table_chroma_inv_tone_map_flag | 1 | u(1) |
| 56 |                 if( lookup_table_chroma_inv_tone_map_flag ) { | 1 | u(1) |
| 57 |                     lookup_table_chrom_inv_tone_map_override_flag | 1 | u(1) |
| 58 |                     if( lookup_table_chroma_inv_tone_map_override_flag || | | |
| 59 |                       ! lookup_table_luma_inv_tone_map_flag ) { | | |
| 60 |                       level_lookup_table_chroma_minus8 | 1 | u(v) |
| 61 |                       for( i=0; i<(1<<(8+ level_lookup_table_chroma_minus8)); | | |
| 62 |                         i++ ) { | | |
| 63 |                           offset_val_lookup_table_cb[ i ] | 1 | u(v) |
| 64 |                       } | | |
| 65 |                     for( i=0; i<(1<<(8+ level_lookup_table_chroma_minus8)); | | |

TABLE 1-continued

Exemplary implementation within Slice Header in scalable extension

| #   | slice_header_in_scalable_extension( ) {                                                                 | C | Descriptor |
| --- | ------------------------------------------------------------------------------------------------------- | - | ---------- |
| 66  |         i++ ) {                                                 |   |            |
| 67  |           offset_val_lookup_table_cr[ i ]             | 1 | u(v)       |
| 68  |         }                                                       |   |            |
| 69  |       }                                                                   |   |            |
| 70  |     }                                                                               |   |            |
| 71  |   }                                                                                           |   |            |
| 72  | }                                                                                                       |   |            |
| 73  |   adaptive_residual_prediction_flag                                                           | 2 | u(1)       |
| 74  | }                                                                                                       |   |            |
| 75  | if( ( weighted_pred_flag && slice_type == EP ) \|\| <br>    ( weighted_bipred_idc == 1 && slice_type == EB ) ) { |   |            |
| 76  |   if( adaptive_prediction_flag)                                                               |   |            |
| 77  |     base_pred_weight_table_flag                                                     | 2 | u(1)       |
| 78  |   if( layer_base_flag \|\| base_pred_weight_table_flag == 0 )                                 |   |            |
| 79  |     pred_weight_table( )                                                            |   |            |
| 80  | }                                                                                                       |   |            |
| 81  | if( nal_ref_idc != 0 ) {                                                                                |   |            |
| 82  |   dec_ref_pic_marking( )                                                                      | 2 |            |
| 83  |   if ( use_base_prediction_flag && nal_unit_type != 21)                                       |   |            |
| 84  |     dec_ref_pic_marking_base( )                                                     |   |            |
| 85  | }                                                                                                       |   |            |
| 86  | }                                                                                                       |   |            |
| 87  | if( entropy_coding_mode_flag && slice_type != EI )                                                      |   |            |
| 88  |   cabac_init_idc                                                                              | 2 | ue(v)      |
| 89  | slice_qp_delta                                                                                          | 2 | se(v)      |
| 90  | if( deblocking_filter_control_present_flag ) {                                                          |   |            |
| 91  |   disable_deblocking_filter_idc                                                               | 2 | ue(v)      |
| 92  |   if( disable_deblocking_filter_idc != 1 ) {                                                  |   |            |
| 93  |     slice_alpha_c0_offset_div2                                                      | 2 | se(v)      |
| 94  |     slice_beta_offset_div2                                                          | 2 | se(v)      |
| 95  |   }                                                                                           |   |            |
| 96  | }                                                                                                       |   |            |
| 97  | if( interlayer_deblocking_filter_control_present_flag ) {                                               |   |            |
| 98  |   disable_interlayer_deblocking_filter_idc                                                    | 2 | ue(v)      |
| 99  |   if( disable_interlayer_deblocking_filter_idc != 1 ) {                                       |   |            |
| 100 |     interlayer_slice_alpha_c0_offset_div2                                           | 2 | se(v)      |
| 101 |     interlayer_slice_beta_offset div2                                               | 2 | se(v)      |
| 102 |   }                                                                                           |   |            |
| 103 | }                                                                                                       |   |            |
| 104 | constrained_intra_upsampling_flag                                                                       | 2 | u(1)       |
| 105 | if( quality_id == 0 )                                                                                   |   |            |
| 106 |   if( num_slice_groups_minus1 > 0 && <br>    slice_group_map_type >= 3 && slice_group_map_type <= 5) |   |            |
| 107 |     slice_group_change_cycle                                                        | 2 | u(v)       |
| 108 | if( quality_id == 0 && extended_spatial_scalability > 0 ) {                                             |   |            |
| 109 |   if ( chroma_format_idc > 0 ) {                                                              |   |            |
| 110 |     base_chroma_phase_x_plus1                                                       | 2 | u(2)       |
| 111 |     base_chroma_phase_y_plus1                                                       | 2 | u(2)       |
| 112 |   }                                                                                           |   |            |
| 113 |   if( extended_spatial_scalability == 2 ) {                                                   |   |            |
| 114 |     scaled_base_left_offset                                                         | 2 | se(v)      |
| 115 |     scaled_base_top_offset                                                          | 2 | se(v)      |
| 116 |     scaled_base_right_offset                                                        | 2 | se(v)      |
| 117 |     scaled_base_bottom_offset                                                       | 2 | se(v)      |
| 118 |   }                                                                                           |   |            |
| 119 | }                                                                                                       |   |            |
| 120 | if( use_base_prediction_flag )                                                                          |   |            |
| 121 |   store_base_rep_flag                                                                         | 2 | u(1)       |
| 122 | if( quality_id == 0 ) {                                                                                 |   |            |
| 123 |   if( BaseFrameMbsOnlyFlag && !frame_mbs_only_flag && <br>    !field_pic_flag) |   |            |
| 124 |     base_frame_and_bottom_field_coincided_flag                                      | 2 | u(1)       |
| 125 |   else if( frame_mbs_only_flag && !BaseFrameMbsOnlyFlag && <br>    !BaseFieldPicFlag ) |   |            |
| 126 |     base_bottom_field_coincided_flag                                                | 2 | u(1)       |
| 127 | }                                                                                                       |   |            |
| 128 | SpatialScalabilityType = spatial_scalability_type( )                                                    |   |            |
| 129 | }                                                                                                       |   |            | lookup_table_luma_inv_tone_map_flag equal to 0 specifies that no lookup table based inverse tone mapping is employed in the inter-layer prediction for Y channel (default).

level_lookup_table_luma_minus8 plus 8 specifies the number of levels of the lookup table for Y channel.

offset_val_lookup_table_luma[i] specifies the value to which the level i in the lookup table for the Y channel is mapped to by the following way:

If i is not equal to 0, the value s[i] to which the level in the lookup table for the Y channel is mapped to is equal to s[i−1] plus offset_val_lookup_table_luma[i], where s[i−1] is the value to which the level i−1 in the lookup table for the Y channel is mapped to.

If i is equal to 0, the value s[i] to which the level i in the lookup table for the Y channel is mapped to is equal to offset_val_lookup_table[i].

lookup_table_chroma_inv_tonemap_flag equal to 1 specifies that the lookup table based inverse tone mapping is employed in the inter-layer prediction for Cb and Cr channels. lookup_table_luma_inv_tone_map_flag equal to 0 specifies that no lookup table based inverse tone mapping is employed in the inter-layer prediction for Cb or Cr channels (default).

lookup_table_chrom_inv_tone_map_override_flag equal to 0 specifies that the lookup table for Y channel is re-used in the inter-layer prediction for Cb and Cr channels (default). lookup_table_chrom_inv_tone_map_override_flag equal to 1 specifies that different lookup tables other than the lookup table for Y channel are used in the inter-layer prediction for Cb and Cr channels.

level_lookup_table_chroma_minus8 plus 8 specifies the number of levels of the lookup table for Cb and Cr channels.

offset_val_lookup_table_cb[i] specifies the value to which the level i in the lookup table for the Cb channel is mapped to by the following way:

if i is not equal to 0, the value s[i] to which the level in the lookup table for the Cb channel is mapped to is equal to s[i−1] plus offset_val_lookup_table_cb[i], where s[i−1] is the value to which the level i−1 in the lookup table for the Cb channel is mapped to.

if i is equal to 0, the value s[i] to which the level i in the lookup table for the Cb channel is mapped to is equal to offset_val_lookup_table_cb[i].

offset_val_lookup_table_cr[i] specifies the value to which the level i in the lookup table for the Cr channel is mapped to by the following way:

if i is not equal to 0, the value s[i] to which the level in the lookup table for the Cr channel is mapped to is equal to s[i−1] plus offset_val_lookup_table_cr[i], where s[i−1] is the value to which the level i−1 in the lookup table for the Cr channel is mapped to.

if i is equal to 0, the value s[i] to which the level i in the lookup table for the Cr channel is mapped to is equal to offset_val_lookup_table_cr[i].

The LUT is generated based upon the original EL slice and the upsampled reconstructed BL slice, and can therefore be used at the decoder to map the upsampled reconstructed BL slice to an EL slice. This has the advantage that the LUT defines a mapping between a slice that is available at the decoder, namely the (upsampled) reconstructed BL slice, and the EL slice with the highest available quality, namely the original EL slice. Thus, the method is optimally adapted to the decoder needs.

At the encoder and the decoder, the intra-coded BL is reconstructed and inter-layer prediction is applied between the original EL and the upsampled reconstructed BL. For Intra-coded slices, the LUT is generated individually for a BL/EL slice pair if the BL is an I-slice, and the LUT is transmitted together with the EL slice. The EL slice is predicted at the encoder from the reconstructed BL slice using this LUT, and the residual is intra-coded and transmitted. Then the LUT is applied at the decoder to the reconstructed BL slice (I-slice), and the residual is added. The result is an EL slice (I-slice) with higher color bit-depth. For P- and B-slices, another technique than LUT should be used because of the possible non-linear transformation between the original BL and the EL; the LUTs that work well for reconstructed BL and the original EL may not work well for residuals.

Regarding the added syntax elements to support LUT based inverse tone mapping, there are two advantages in inserting them into slice_header_in_scalable_extension:

First, in practice, different slices can have different LUTs. Adding the new syntax elements in slice level allows flexibility of employing inverse tone mapping. E.g. in the case of object-based segmentation of slices, the different slices owe different characteristics and the relationship between BL slice and collocated EL slice could be quite different among different slices. Therefore, it may be beneficial to create different LUTs for different slices.

Further, when in JSVM the slice level syntax elements are written into the bitstream, the reconstructed BL is available and then the LUT can be created. If the LUT information was written e.g. into Sequence Parameter Set (SPS) or Picture Parameter Set (PPS), this would require a significant change of JSVM.

Inter Coding

Bit depth scalability for inter-coding is implemented different from that for intra-coding. In the current SVC standard, motion upsampling and residual upsampling were designed for spatial inter texture inter-layer prediction.

For inter-coded slices (P- and B-slices), the inter-layer prediction is not based on the reconstructed BL. This enables compliance to spatial scalability of SVC. Therefore, motion-compensated prediction is applied at the EL, as done in spatial scalability. The residual between the reconstructed BL and the original EL is then transformed, quantized and entropy-coded.

Figure 3:
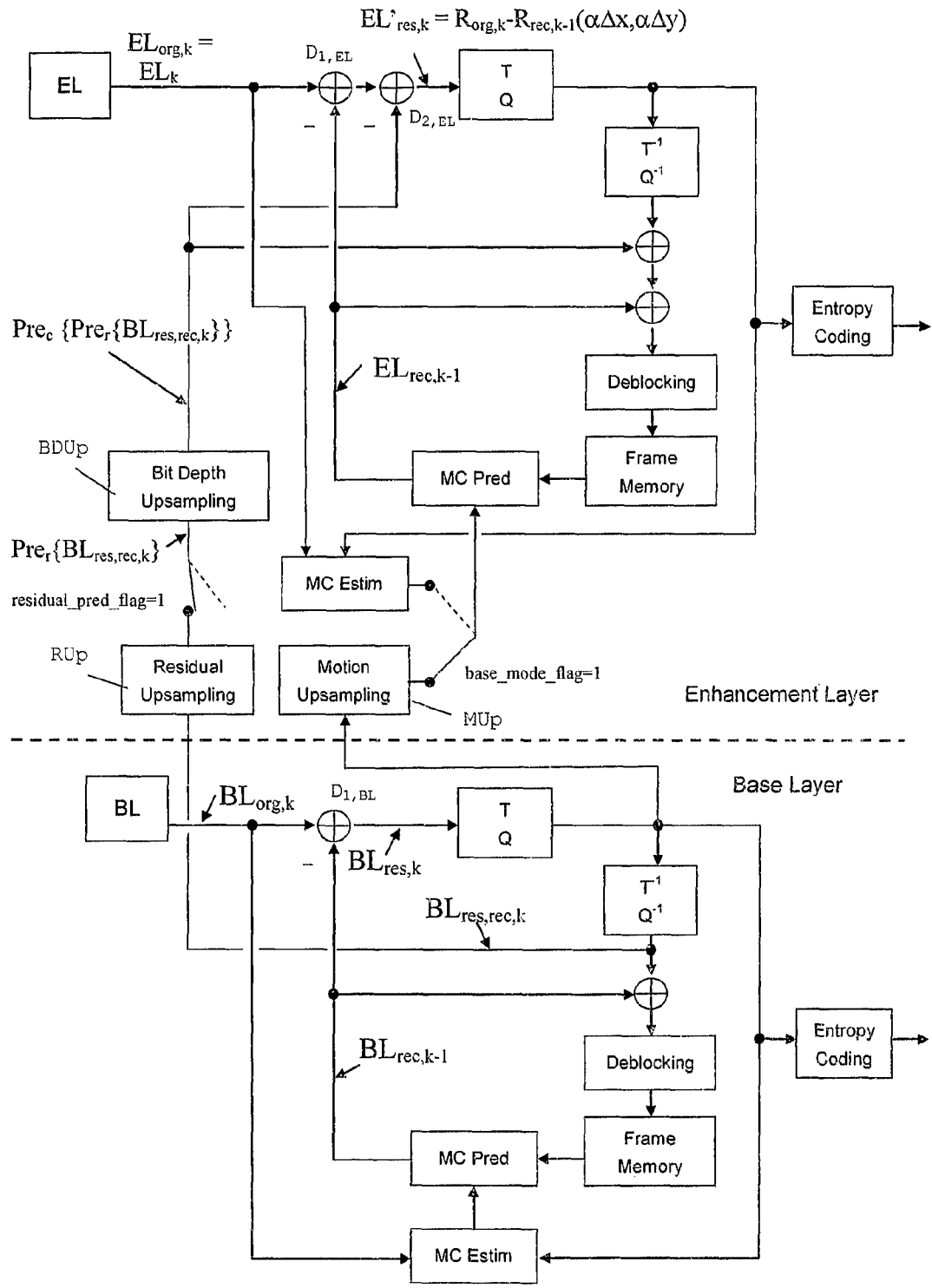
FIG. 3 an encoder for the extension of residual inter-layer prediction of spatial scalability to color bit depth scalability.
Figure 5:
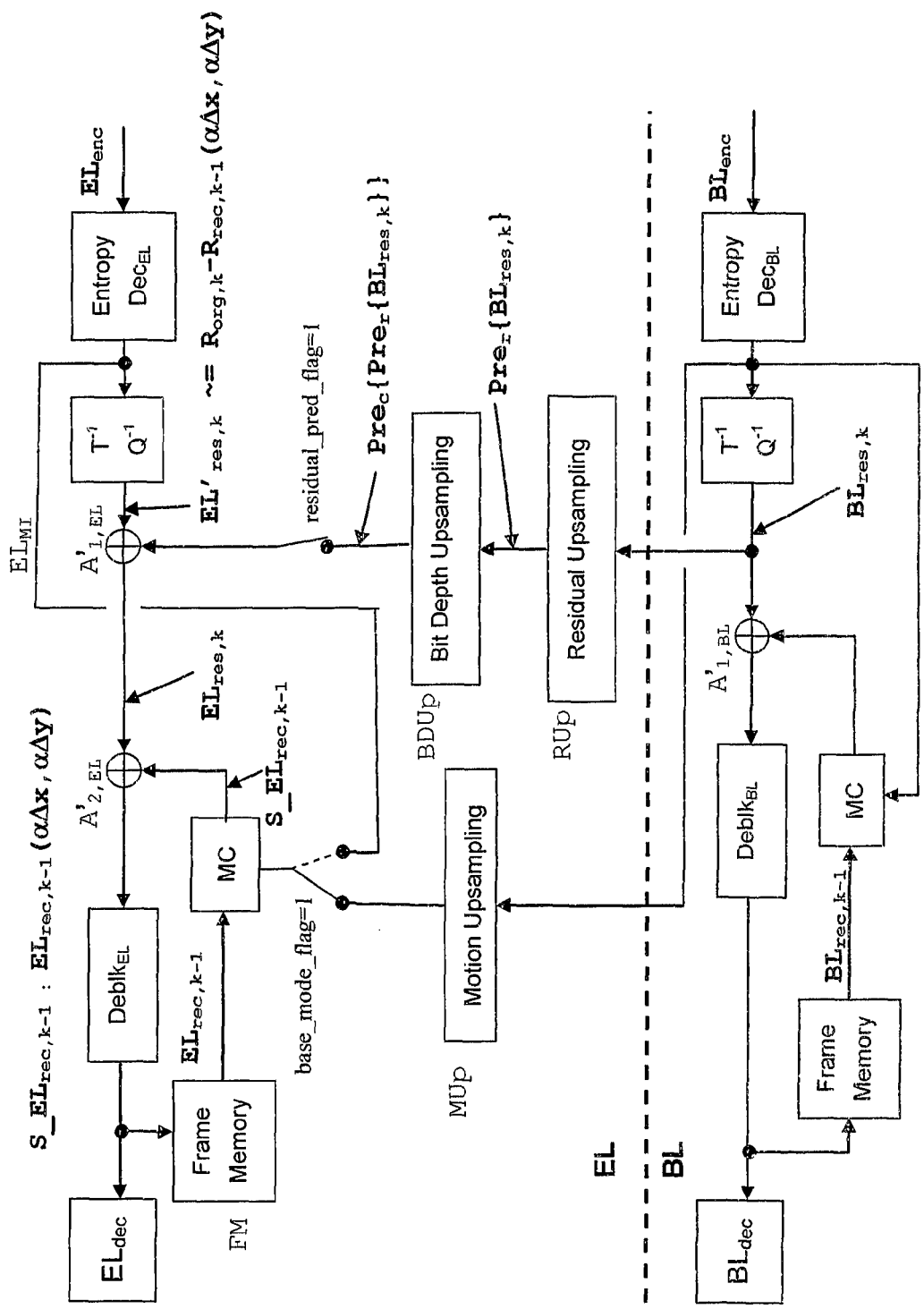
FIG. 5 a decoder for the extension of residual inter-layer prediction of spatial scalability to color bit depth scalability.

As for P- and B-slices, the technique illustrated in FIG. 3 and FIG. 5 is applied. It may also be possible to use the same LUTs as one of the I-slices to predict the EL residual from the BL residual, but the results are not good because of the possible non-linear transformation between the original BL and the EL. Thus, the LUTs that work well for reconstructed BL and the original EL may not work well for residuals.

FIG. 3 shows an encoder for the extension of residual inter-layer prediction for inter-coded (P and B) macroblocks. The bit depth scalability is realized by the step of bit depth upsampling BDUp that (in this example) directly follows (spatial) residual upsampling RUp. The input to the residual upsampling RUp is the reconstructed BL residual $BL_{res,rec,k}$ which is a reconstructed version of the to-be-transmitted BL residual $BL_{res,k}$ (as expressed in Eq. (3) below). In practice, motion upsampling MUp is often done first, and then the residual upsampling RUp is done as a kind of spatial inter-layer prediction. Finally, the bit depth upsampling BDUp is done as bit depth inter-layer prediction. With the motion upsampling MUp, residual upsampling RUp and the color bit depth upsampling BDUp, a predicted version $Pre_c\{Pre_r\{BL_{res,rec,k}\}\}$ of the N-bit EL macroblock is obtained. The resulting enhancement layer residual $EL'_{res,k}$ (as defined in (Eq. 3) below) is further transformed T, quantized Q and entropy encoded to form the EL sub-bitstream, like in SVC.

Different variations of the encoding process are possible, and can be controlled by control parameters. Flags shown in FIG. 3 are base_mode_flag, which controls whether EL motion compensation is based on motion vectors obtained from the EL or upsampled from the BL, and residual_pred_flag, which controls whether the BL residual is used to predict the EL residual. As shown in FIG. 2, the base_mode_flag is also used for controlling intra texture inter-layer prediction.

Figure 4:
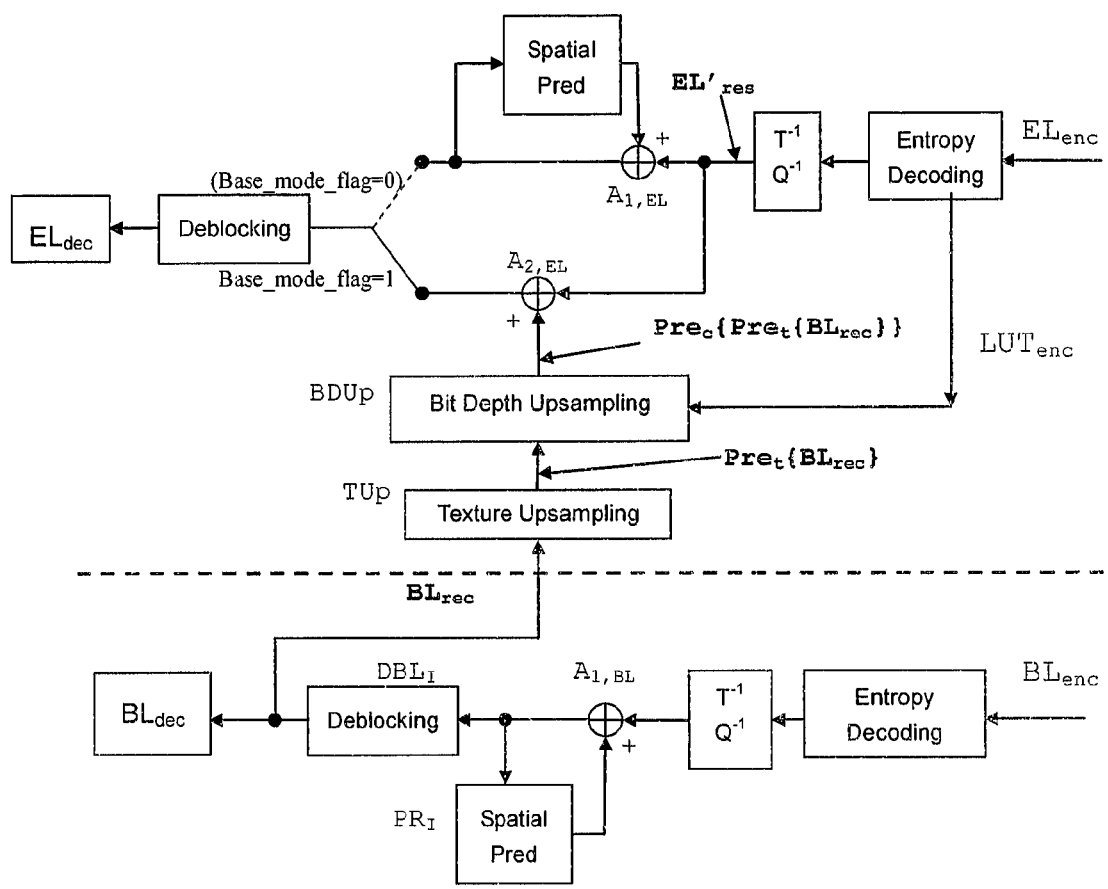
FIG. 4 a decoder for the extension of the intra texture inter-layer prediction of spatial scalability to color bit depth scalability.

FIG. 4 shows an exemplary decoder for intra coded BL images that utilizes inter-layer prediction. After receiving encoded BL and EL information, e.g. in a multiplexed packetized bitstream, and separating BL from EL information, the BL information as well as EL information is entropy decoded. Then inverse quantization $Q^{-1}$ and inverse transformation $T^{-1}$ are applied. For the BL, the processing is the same as for conventional SVC: the images are reconstructed using spatial intra prediction, i.e. based on previously reconstructed information of the same image. After deblocking, the resulting BL signal $BL_{rec}$ can be displayed on a standard SVC display with 8 bit color depth, as described above. Alternatively however this signal can also be used to generate a predicted version of the collocated EL image $Pre_c\{Pre_t\{BL_{rec}\}\}$: for this purpose it is texture upsampled TUp, wherein a texture predicted version of the EL image $Pre_t\{BL_{rec}\}$ is obtained, which is then bit-depth upsampled BDUp using the extracted look-up table. The texture and bit depth upsampled reconstructed BL image $Pre_c\{Pre_t\{BL_{rec}\}\}$ is then used to update $A_{2,EL}$ the improved, inverse quantized and inverse transformed EL residual $EL'_{res}$, thereby obtaining a signal that after deblocking can be output as EL video $EL_{rec}$ for HQ displays.

Of course a decoder that is operated in EL mode generates internally also the BL video $BL_{rec}$, since it is required for EL prediction, but the BL video needs not necessarily be available at the decoder output. In one embodiment the decoder has two outputs, one for BL video $BL_{rec}$ and one for EL video $EL_{rec}$, while in another embodiment it has only an output for EL video $EL_{rec}$.

As described above for the intra encoder of FIG. 2, also the decoder can work in different modes corresponding to the encoding. Therefore respective flags are extracted from the bitstream and evaluated, e.g. an indication base_mode_flag that decides whether or not inter-layer prediction is used. If not, EL images are conventionally reconstructed using deblocking, spatial prediction and update $A_{1,EL}$ of the spatially predicted image.

FIG. 5 shows an exemplary decoder for inter-coded units, e.g. inter-coded MBs. From a BL bitstream, which may have been entropy coded and is correspondingly decoded, in one embodiment motion data are detected and extracted and can be upsampled for the EL if required. This can be indicated by an indication that is included in the BL or EL bitstream. Further, BL bitstream data are inverse quantized $T^1$ and inverse transformed $T^{-1}$, whereby a reconstructed BL residual $BL_{res,k}$ is obtained. If a BL video signal $BL_{dec}$ is required, further BL processing includes conventional SVC decoding including deblocking, storage in a frame memory, motion compensation and updating the motion compensated prediction image with the residual $BL_{res,k}$. If only an EL video signal is required, these steps can be omitted.

The residual $BL_{res,k}$ is used for predicting EL data: it is upsampled by residual upsampling RUp, which is a kind of spatial upsampling i.e. the number of values is increased, and bit depth upsampling i.e. the bit depth and thus the possible range of each value is increased BDUp, to produce a predicted signal $Pre_c\{Pre_r\{BL_{res,k}\}\}$. If the collocated EL unit has been encoded using residual inter-layer prediction, as indicated by a flag residual_pred_flag, the predicted residual $Pre_c\{Pre_r\{BL_{rec}\}\}$ is used to update $A'_1$ the received, inverse quantized and inverse transformed EL residual $EL'_{res,k}$, whereby the actual EL residual $EL_{res,k}$ is obtained. The received, inverse quantized and inverse transformed EL residual $EL'_{res,k}$ is in principle equivalent to the difference between the conventional spatial EL residual $R_{org}$ and a residual $R_{rec,k-1}(\alpha\Delta x, \alpha\Delta y)$ that was reconstructed in the encoder from a previous unit k−1 and then upsampled.

The further EL processing is in principle like in SVC (however using enhanced bit depth): the reconstructed residual $EL_{res,k}$ is used to update a predicted EL image $S\_EL_{rec,k-i} = EL_{rec,k-1}(\alpha\Delta X, \alpha\Delta y)$ with steps of deblocking $Deblk_{EL}$, storage in a frame memory FM and motion compensation MC of the reconstructed image $EL_{rec,k-1}$. If the received enhancement layer data $EL_{enc}$ contains motion information $EL_{MI}$, the motion information is extracted and can be provided to the motion compensation unit MC. Alternatively the upsampled MUp motion information from the BL can be used.

Figure 6:
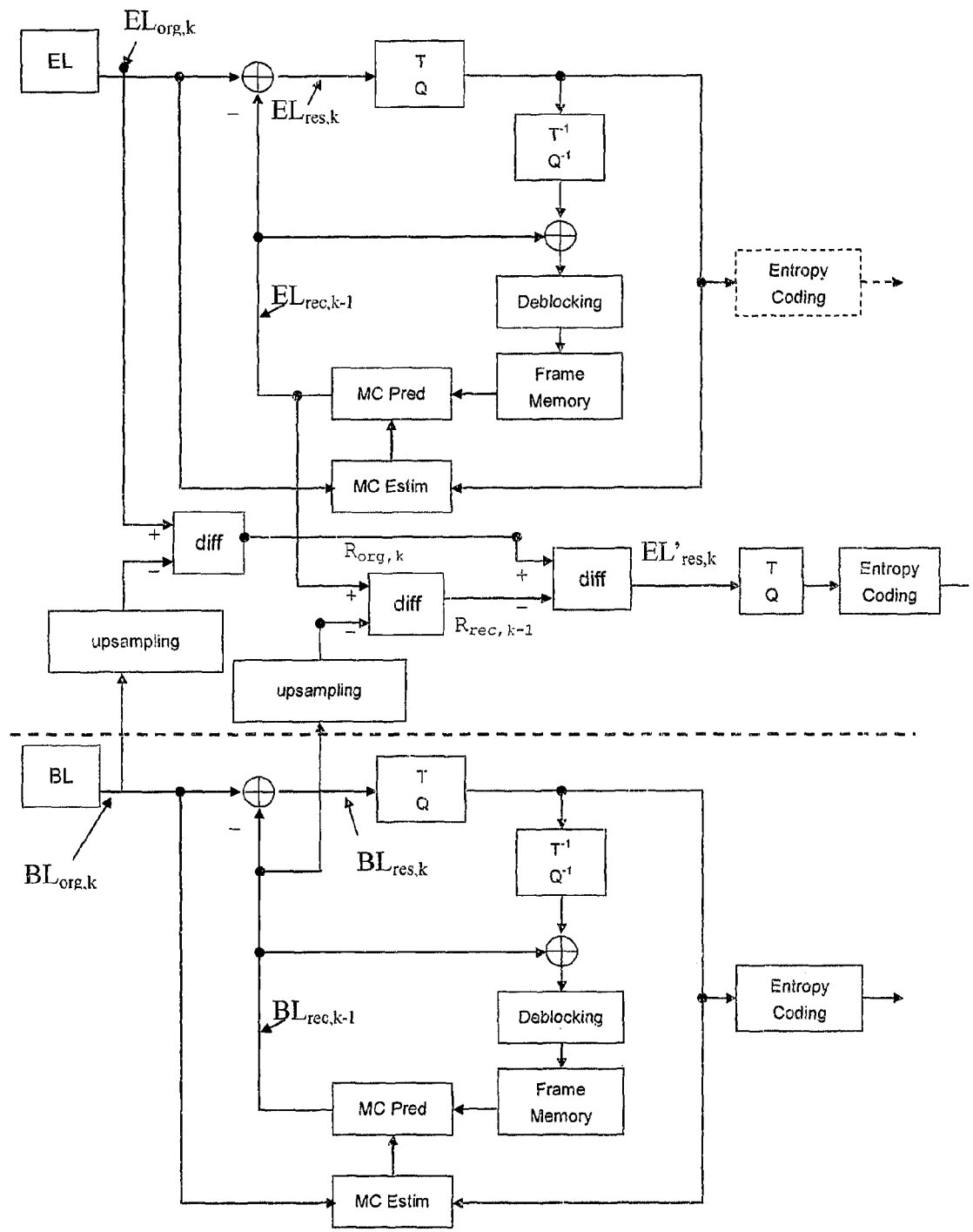
FIG. 6 a logical equivalent of the framework of the extension of residual inter-layer prediction of spatial scalability to color bit depth scalability.

Apparently the improved EL residual according to the invention is different from that defined in SVC spatial scalability. However, its encoding is in principle equivalent to inter encoding the difference between the original EL macroblock $EL_{org,k}$ and the texture (spatially) and bit depth upsampled BL macroblock $Pre_c\{Pre_r\{BL_{org,k}\}\}$, as shown in FIG. 6.

One advantage of the presented extension of the spatial scalability to bit depth scalability is that no new prediction mode is needed to realize the extension to color bit depth scalability.

Another advantage, particularly for inter coding, is that a high coding efficiency is obtained because the finally encoded EL residual is "the residual of the residual", and therefore equivalent to inter encoding of the inter-layer residual as defined in (Eq. 3). In practice, the final coded EL residual in inter coding is equivalent to the original EL macroblock minus the motion (upsampled motion) compensated reconstructed reference EL macroblock and then minus the motion compensated, residual upsampled and then bit depth upsampled version of the collocated BL reconstructed residual.

A further advantage is that for the case of inter coding there is no need to reconstruct the BL macroblocks. Thus, BL reconstruction can be skipped, which makes the decoder simpler.

Advantageously, the intra coding of the color bit depth scalability is realized by the presented intra color bit depth inter-layer prediction that in one embodiment directly follows the intra texture inter-layer prediction.

Further advantages of the present invention are the complete compatibility to other types of scalability, robustness and extendibility to advanced techniques. In particular, the present invention improves the coding efficiency while still keeping a single-loop decoding framework to apply the LUT-based inverse tone mapping only to base layer I-slices.

It is also an advantage that for upsampling of inter-coded slices the reconstructed slices are used, because at the decoder only the reconstructed BL but not the original BL is available. Therefore the prediction at the encoder side is better adapted to the prediction at the decoder side, so that the residuals are better and at the decoder side better prediction and reconstruction results can be achieved.

The invention can be used for scalable encoders, scalable decoders and scalable signals, particularly for video signals or other types of signals that have different quality layers and high inter-layer redundancy.

It will be understood that the present invention has been described purely by way of example, and modifications of detail can be made without departing from the scope of the invention. Each feature disclosed in the description and (where appropriate) the claims and drawings may be provided independently or in any appropriate combination. Features may (where appropriate) be implemented in hardware, software, or a combination of the two. Reference numerals appearing in the claims are by way of illustration only and shall have no limiting effect on the scope of the claims.

The invention claimed is:

1. Method for encoding video data having a base layer and an enhancement layer, wherein the base layer has lower bit-depth resolution and lower spatial, temporal and/or SNR resolution than the enhancement layer, the method comprising the steps of
   encoding base layer data on slice level, wherein first base layer slices are intra-coded and second base layer slices are inter-coded;
   reconstructing the encoded base layer slices;
   upsampling reconstructed base layer slices, wherein first predicted versions of the corresponding enhancement layer slices are obtained that have higher spatial, temporal or SNR resolution than the base layer slices;
   generating for a first, intra-coded base layer slice a tone mapping table defining an individual mapping between an upsampled reconstructed first base layer slice and the corresponding original enhancement layer slice, wherein both slices are compared to each other and wherein no tone mapping tables are generated for second, inter-coded base layer slices, and wherein for each pair of Intra coded slices an individual tone mapping table is generated and encoded, and no tone mapping tables are generated for any pair of Inter coded slices;
   bit-depth upsampling the first predicted version of the enhancement layer slice based on said tone mapping, wherein a second predicted version of the corresponding enhancement layer slice is obtained that has higher bit-depth resolution than the first predicted version of the enhancement layer slice;
   generating an enhancement layer residual being the difference between the original enhancement layer slice and the corresponding second predicted version of the enhancement layer slice; and
   encoding the enhancement layer residual into an enhancement layer slice, wherein the enhancement layer slice includes in its slice header its corresponding tone mapping table.

2. Method according to claim 1, wherein for an Intra-coded slice separate tone mapping tables are generated for luminance and chrominance channels.

3. Method according to claim 1, wherein the step of upsampling reconstructed base layer slices comprises in the case of Inter coded base layer slices upsampling of reconstructed base layer residual data.

4. Method for decoding video data having a base layer and an enhancement layer and being encoded on slice level, the method comprising the steps of
   receiving enhancement layer information and base layer information;
   extracting from the enhancement layer information tone mapping data from slice headers of intra-coded enhancement layer slices;
   performing inverse quantization and inverse transformation on the received information, wherein inverse quantized and inverse transformed enhancement layer information comprises residual information;
   reconstructing intra-coded base layer slices;
   upsampling base layer information, wherein the number of pixels is increased and for the increased number of pixels the value depth per pixel is increased, wherein for intra-coded slices but not for inter-coded slices, the reconstructed base layer slices and the extracted tone mapping data are used, and wherein predicted enhancement layer information is obtained; and
   reconstructing from the predicted enhancement layer information and the inverse quantized and inverse transformed enhancement layer information reconstructed enhancement layer video information.

5. Method according to claim 4, wherein said tone mapping data are extracted only from each slice header of the enhancement layer.

6. Method according to claim 4, further comprising the steps of extracting from the received inter-coded enhancement layer information motion information and reconstructing enhancement layer video, wherein said enhancement layer motion information is used.

7. Apparatus for encoding video data having a base layer and an enhancement layer, wherein the base layer has lower bit-depth resolution and lower spatial, temporal and/or SNR resolution than the enhancement layer, comprising
   means for encoding base layer data on slice level, wherein first base layer slices are intra-coded and second base layer slices are inter-coded;
   means for reconstructing the encoded base layer slices;
   means for upsampling reconstructed base layer slices, wherein first predicted versions of the corresponding enhancement layer slices are obtained that have higher spatial, temporal or SNR resolution than the base layer slices;
   means for generating for a first, intra-coded base layer slice a tone mapping table defining an individual mapping between an upsampled reconstructed first base layer slice and the corresponding original enhancement layer slice, wherein both slices are compared to each other and wherein no tone mapping tables are generated for second, inter-coded base layer slices, and wherein for each pair of Intra coded slices an individual tone mapping table is generated and encoded, and no tone mapping tables are generated for any pair of Inter coded slices;
   means for bit-depth upsampling the first predicted version of the enhancement layer slice based on said tone mapping, wherein a second predicted version of the corresponding enhancement layer slice is obtained that has higher bit-depth resolution than the first predicted version of the enhancement layer slice;
   means for generating an enhancement layer residual being the difference between the original enhancement layer slice and the corresponding second predicted version of the enhancement layer slice; and
   means for encoding the enhancement layer residual into an enhancement layer slice, wherein the enhancement layer slice includes in its slice header its corresponding tone mapping table.

8. Apparatus according to claim 7, further comprising look-up table means for storing the tone mapping table.

9. Apparatus for decoding video data having a base layer and an enhancement layer and being encoded on slice level, comprising means for receiving enhancement layer information and means for receiving base layer information;

means for extracting from the enhancement layer information tone mapping data from slice headers of intra-coded enhancement layer slices;

means for performing inverse quantization and inverse transformation on the received information, wherein inverse quantized and inverse transformed enhancement layer information comprises residual information;

means for reconstructing intra-coded base layer slices;

means for upsampling base layer information, wherein the number of pixels is increased and for the increased number of pixels the value depth per pixel is increased, wherein for intra-coded slices but not for inter-coded slices the reconstructed base layer slices and the extracted tone mapping data are used, and wherein predicted enhancement layer information is obtained; and means for reconstructing from the predicted enhancement layer information and the inverse quantized and inverse transformed enhancement layer information reconstructed enhancement layer video information.

10. Apparatus according to claim 9, further comprising look-up table means for storing the tone mapping table.

* * * * *